United States Patent
Vasko et al.

(10) Patent No.: US 6,430,454 B1
(45) Date of Patent: Aug. 6, 2002

(54) SELF-ORGANIZING INDUSTRIAL CONTROL SYSTEM USING ITERATIVE REVERSE MODELING TO EVALUATE BIDS

(75) Inventors: David A. Vasko, Macedonia; Francisco P. Maturana; Rebecca J. Herr, both of Twinsburg, all of OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 09/407,604

(22) Filed: Sep. 28, 1999

Related U.S. Application Data

(63) Continuation-in-part of application No. 09/261,273, filed on Mar. 3, 1999, now Pat. No. 6,672,391, which is a continuation-in-part of application No. 09/164,204, filed on Sep. 30, 1998, now Pat. No. 6,091,998.

(51) Int. Cl.[7] ............................................... G06F 19/00
(52) U.S. Cl. ...................................... 700/100; 700/103
(58) Field of Search .......................... 700/97, 100, 102, 700/103, 105, 109, 96, 99, 101, 104

(56) References Cited

U.S. PATENT DOCUMENTS

| | | | | |
|---|---|---|---|---|
| 5,353,229 A | * | 10/1994 | Tanaka | 700/103 |
| 5,406,476 A | * | 4/1995 | Deziel, Jr. et al. | 705/8 |
| 5,659,478 A | * | 8/1997 | Pennisi et al. | 700/95 |
| 5,808,891 A | * | 9/1998 | Lee et al. | 700/108 |
| 5,845,258 A | * | 12/1998 | Kennedy | 705/8 |
| 5,909,368 A | * | 6/1999 | Nixon et al. | 700/2 |
| 5,912,678 A | * | 6/1999 | Saxena et al. | 700/103 |
| 5,946,212 A | * | 8/1999 | Bermon et al. | 700/97 |
| 5,950,170 A | * | 9/1999 | Pan et al. | 705/7 |
| 5,953,229 A | * | 9/1999 | Clark et al. | 700/100 |
| 6,091,998 A | * | 7/2000 | Vasko et al. | 700/100 |
| 6,094,955 A | * | 8/2000 | Vasko et al. | 72/7.2 |
| 6,722,391 | * | 8/2001 | Maturana et al. | 700/103 |

* cited by examiner

*Primary Examiner*—Leo Picard
*Assistant Examiner*—Chad Rapp
(74) *Attorney, Agent, or Firm*—Keith M. Baxter; Alexander M. Gerasimow; R. Scott Speroff

(57) ABSTRACT

An industrial control system uses a number of autonomous control units, each associated with one piece of equipment in an industrial process. The autonomous control units negotiate by bidding among themselves to determine a common set of input and output values for the interconnected machines with which they are associated. Each autonomous control unit determines whether input values are acceptable by using a model of its associated equipment. The model provides anticipated output values based on given input values and is effectively operated in reverse for external counterbids proposing output values and needing to know input values, or internal counterbids seeking to optimize counterbid input values against output based goals. The reverse modeling iteratively applies inputs to the model until the desired output is attained. The inputs may be constrained by predefined intermediate constraints and may be changed in a binary search pattern. In multi-input models, one input may be specified for iteration.

10 Claims, 10 Drawing Sheets

US 6,430,454 B1

SELF-ORGANIZING INDUSTRIAL CONTROL SYSTEM USING ITERATIVE REVERSE MODELING TO EVALUATE BIDS

CROSS-REFERENCE TO RELATED APPLICATIONS

This application is a continuation-in-part of U.S. patent application Ser. No. 09/261,273 filed Mar. 3, 1999 U.S. Pat. No. 6,272,391 issued Aug. 7, 2001 and entitled: Self Organizing Industrial Control System Importing Neighbor Constraint Ranges, which is a continuation-in-part of U.S. patent application Ser. No. 09/164,204 filed Sep. 30, 1998, U.S. Pat. 6,091,998 issued Jul. 18, 2000 and entitled: Self-Organizing Industrial Control System Using Bidding Process.

STATEMENT REGARDING FEDERALLY SPONSORED RESEARCH OR DEVELOPMENT

BACKGROUND OF THE INVENTION

The present invention relates to industrial controllers for the real-time control of equipment used in manufacturing and in particular to an industrial controller that automatically organizes equipment for the manufacture of a product based on the capabilities of the equipment.

Industrial controllers are special purpose computers used in controlling industrial processes. Under the direction of a stored control program, an industrial controller examines a series of inputs reflecting the status of the controlled process and changes a series of outputs controlling the industrial process. The inputs and outputs may be binary, that is, on or off, or analog, providing a value within a continuous range. The inputs may be obtained from sensors attached to the controlled equipment and the outputs may be signals to actuators on the controlled equipment.

Unlike the standardized software normally executed on conventional computers, the control program executed on an industrial controller is normally unique to each controlled process. The writing and troubleshooting of the control program is thus a significant cost in the creation of an industrial control system. After the controlled program is complete, it must often be modified as the product to be manufactured changes or as equipment is exchanged, replaced or repaired.

The above referenced grand parent to this application describes a self-configuring industrial control system employing a number of autonomous control units, each associated with a particular piece of manufacturing equipment. The autonomous control units are programmed with data describing the capabilities of their equipment and the equipment's ability to interact with other equipment. A desired product is described in a "job description language" and broadcast to the autonomous control units, each which identifies portions of the job that they can complete. The autonomous control units then exchange bids and counter-bids with the other autonomous control units to allocate the job among units and to select the desired operating parameters of the associated equipment. The autonomous control units are programmed with generalized goals so that the allocation may be further optimized for high productivity, low cost or some other objective measure.

The above referenced parent to this application describes an improvement to this bidding process in which each autonomous control unit exchanges intermediate constraints, that is, their common ranges of inputs and outputs, with upstream and downstream equipment. By importing these constraint ranges into the autonomous control units, the process of bidding can be simplified and shortened because each autonomous control unit can pre-evaluate its bids against the ranges before they are submitted, preventing unacceptable bids from being further processed.

A bid which proposes input values may be evaluated according to whether those input values are within the input constraint range. Further, the input values can be provided to a model of the sub-process so that modeled output values can be compared against output constraint ranges. More troublesome are counterbids, essential to any bidding process, which propose output values. The output values may be compared against the output constraint range but most models of complex sub-processes cannot provide input values as a function of output values. For this reason, the input resulting from the output values of the counterbids cannot be evaluated against the input constraints. Importantly too, when bid input values produce less than optimum output values, new input values from which to form a counter-bid are not readily determined, even if the optimum output value is known.

What is needed is a method of evaluating both input and output bids with a conventional forward model of the subprocess.

BRIEF SUMMARY OF THE INVENTION

The present invention solves the problem of responding to counterbids that propose output values and of optimizing bid input values by iteratively operating a forward model with different inputs until a given output if found, thus effectively but not actually, running the forward model in reverse. A binary iteration technique reduces the time required for this operation.

Specifically, the present invention provides an autonomous control unit forming part of an industrial controller for controlling a process, the autonomous control unit associated with a sub-process of the process and used with other autonomous control units associated with other sub-processes, each subprocess having input variables describing the input conditions to the subprocess and output variables describing output conditions of the subprocess. The autonomous control unit includes a network connection allowing intercommunication between the autonomous control unit and other autonomous control units and allowing receipt by the autonomous control unit of a job plan describing the process. The autonomous control unit further includes an electronic memory holding (1) a subprocess model relating the input variables to the output variables for the sub-process; and (2) a constraint table holding a constraining range for the input and output variables having range extremes. An electronic computer in the autonomous control unit communicates with the network connection and the electronic memory and executes a stored program to:

(1) receive a proposed value of an output variable from a second autonomous control unit;

(2) try selected input variables in the subprocess model to produce a resultant output variable;

(3) iteratively change the selected input variables until the resultant output variable matches the proposed value of the output variable;

(4) compare an ultimate value of the iteratively changed selected input variable to the constraining range; and (5) when the ultimate value satisfies the constraint range, responding to the second autonomous control unit indicating acceptance of the proposed input variable as part of a response to the job plan.

Thus it is one object of the invention to provide a method of responding to counterbids in a bidding system using a single forward model of a subprocess.

Alternatively or in addition the electronic memory may include an optimizing function indicating preferred values of the input variables and the electronic computer may executing the stored program to:

(1) receive a proposed value of an input variable, from a second autonomous control unit;

(2) apply the proposed value of the input variable to the model to produce a resultant output variable;

(3) when the resultant output variable is within its constraint range, iteratively change the value of the input variables applied to the model to optimize the input variable according to the optimizing function while keeping the output values within the constraint range; and (4) responding to the second autonomous control unit indicating a counterbid of the iteratively changed value of the input variable.

Thus it is another object of the invention to provide a method of optimizing counterbids using a single forward model of a subprocess.

The autonomous control unit executing the stored program can iteratively change selected input variables at each iteration by one-half the difference of the previous iterative change.

Thus it is another object of the invention to efficiently traverse input space in seeking to reverse model a process. Absent a priori knowledge about the process, a binary search pattern will provide fastest convergence on an answer.

The iteratively changed selected input variable may be initially changed by one-half of the difference between the input value and one range extreme.

Thus it is another object of the invention to minimize the input space traversed by reference to the input constraint extremes.

The output variable of the model may be a function of multiple input variables and the selected input variable may be chosen from among the multiple input variables according to a predetermined priority list.

Thus it is another object of the invention to provide a systematic reverse modeling that give priority to variables that can be pre-assigned by the user.

The foregoing and other objects and advantages of the invention will appear from the following description. In the description, reference is made to the accompanying drawings which form a part hereof and in which there is shown by way of illustration a preferred embodiment of the invention. Such embodiment does not necessary represent the full scope of the invention, however, and reference must be made to the claims herein for interpreting the scope of the invention.

DETAILED DESCRIPTION OF THE INVENTION

Components of the Control System

Figure 1:
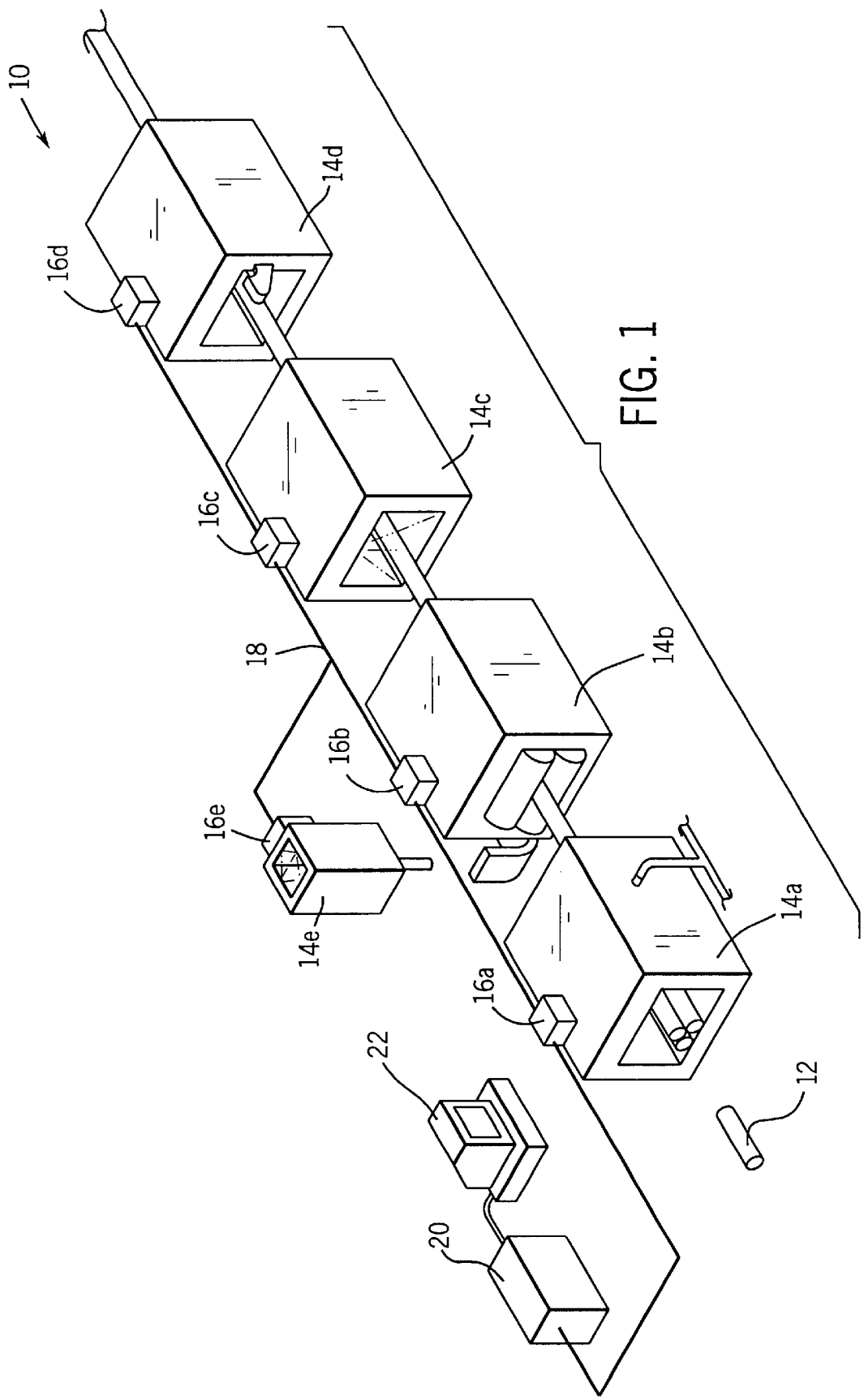
FIG. 1 is a perspective view of a simplified rolling mill composed of a sequential set of machines each associated with an autonomous control unit per the present invention.

Referring now to FIG. 1, an industrial process 10 may provide for the processing of metal billets 12 through a series of machines 14. Each machine 14 may have an associated autonomous control unit 16 being either discrete devices as shown in FIG. 1 or portions of a centralized machine. The autonomous control units 16 may be separate computers interconnected by a common communication link 18 and also connected by the communication link 18 to a controller 20 and a human/machine interface such as a computer terminal 22 of conventional design. Alternatively, the autonomous control units 16 may be partitions of controller 20 communicating with the machines 14 via sensors and actuators on the machines 14.

In an example, process 10 suitable for control by the present invention, machines 14 may include a reheat furnace 14a for heating precast billets 12 to a predetermined temperature, a rolling mill 14b for rolling the billets 12 to a predetermined diameter, a water bath 14c for cooling the billets 12 with water and a Stelmor conveyor 12d cooling the billets 12 with air. The billets 12 may alternatively come directly from a continuous casting machine 14e at casting temperature without the need for reheating by reheat furnace 14a. In this case, the billets pass directly from the continuous caster 14e to the rolling mill 14b.

Figure 2:
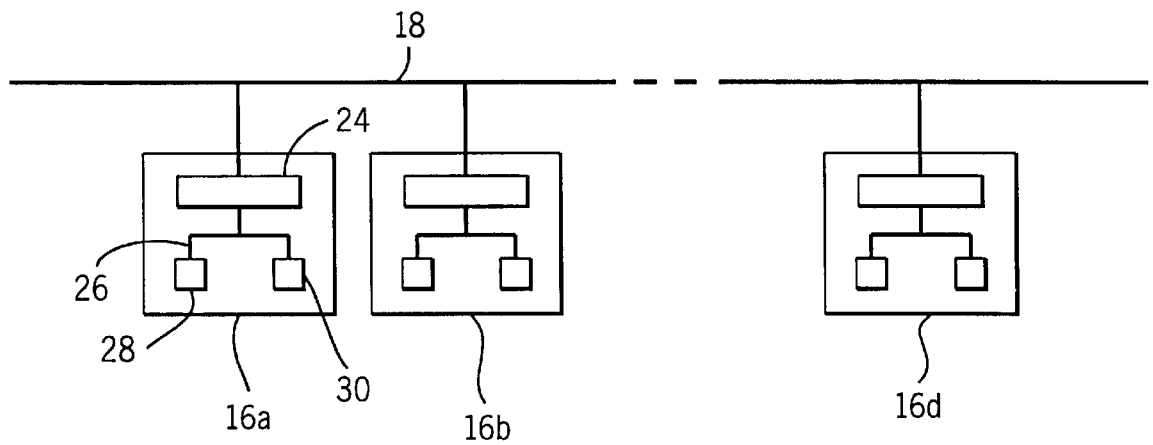
FIG. 2 is a schematic block diagram of the autonomous control units of FIG. 1 showing the inter connection of the autonomous control units through interfaces on a common link and processors and memories of the autonomous control units.
Figure 3:
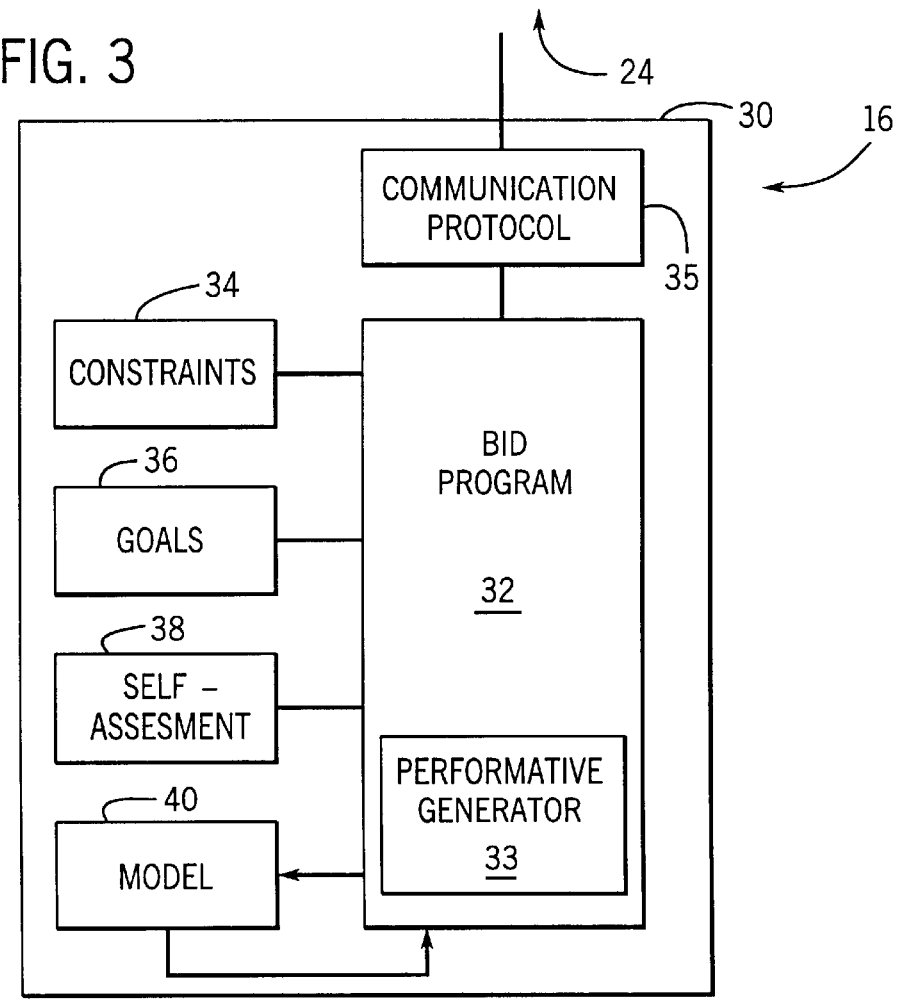
FIG. 3 is a detailed block diagram of the memory of one autonomous control unit of FIG. 2 showing the contained bid program (including a performative generator), constraint data, goal data, self-assessment data, and a model of the equipment associated with the autonomous control unit.

Referring now to FIGS. 2 and 3, each autonomous control unit 16 includes an interface circuit 24 connected with the common communication link 18 and handling communication protocols so that the autonomous control units 16 may communicate bids and counter-bids among themselves and may receive a job description as will be discussed below. The interface circuits 24 of each autonomous control unit 16 are connected by an internal bus 26 to a processor 28 and memory 30.

Data Structures

Referring now to FIG. 3, the memory 30 holds a bid program 32 that will be used to generate bids and counter-bids to be exchanged among the autonomous control units 16 in developing a control strategy for the machines 14. The bids and counter-bids, as well as other types of messages are uniquely identified in purpose by performatives embedded in message wrappers holding bid data and establishing the context of the bid data according to the type of performative as will be described. The message wrappers may be semantically analyzed to identify the performative, such as "preliminary bid", "determination" or "final bid", "counter-bid" and "rejection", to determined the stage of the bidding process and the appropriate range of responses, which my also be conveyed by a performative as well. Other performatives will be noted below, each associated with one or more stages of the bidding process. Generally the format of the performatives may follow the format of a standard agent control language such as KQML. A performative generator 33 accomplishes the task of identifying the particular stage of the bidding from the performatives.

Figure 16:
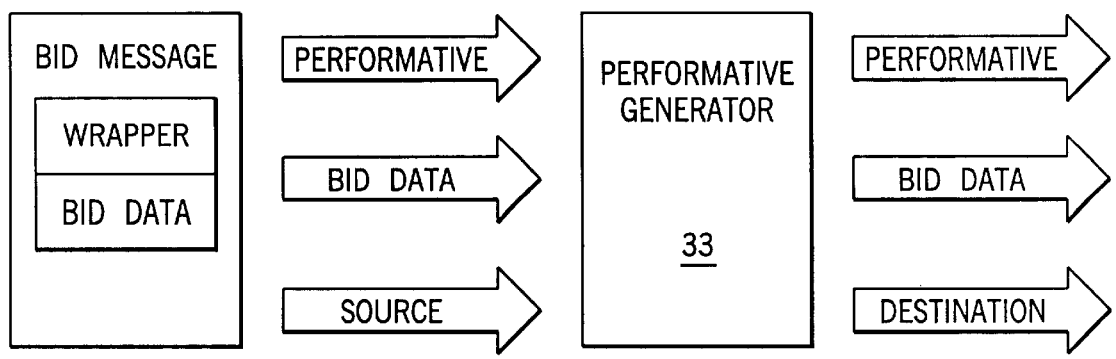
FIG. 16 is a block diagram showing the inputs and outputs of the performative generator of FIG. 3.

The bid program 32 communicates with the other autonomous control units 16 according to a communications protocol program 35 which extracts performatives and data from incoming message from other autonomous control units 16 and which determines the source of the message (i.e., the identity of the sending autonomous control unit 16) and which accepts response performatives, data and the identification of a destination autonomous control unit 16 to properly format a message to that destination autonomous control unit 16. The communications protocol program 35 thus provides a network connection to the performative generator. Referring to FIG. 16, the performative generator 33 accepts as inputs the extracted performatives, data and source and produces the response performatives, data and destination necessary to effectuate a converging bid process as will be described below. The performative generator 33 thus serves to interpret in the broadest sense, bids and counter-bids and to direct bids and counter-bids to the correct device according to a predefined protocol.

The performative generator 33, as part of the bid program 32 has access to stored data tables representing constraint data 34 which generally quantifies the limitations of performance of the associated machine 14, goal data 36, which describes preferences among modes of operation of the associated machine 14 within the constraints 34, self-assessment data 38 generally describing the dynamic state of the associated machine, and a model 40 modeling operation of the associated machine by mathematical means.

Figure 4:
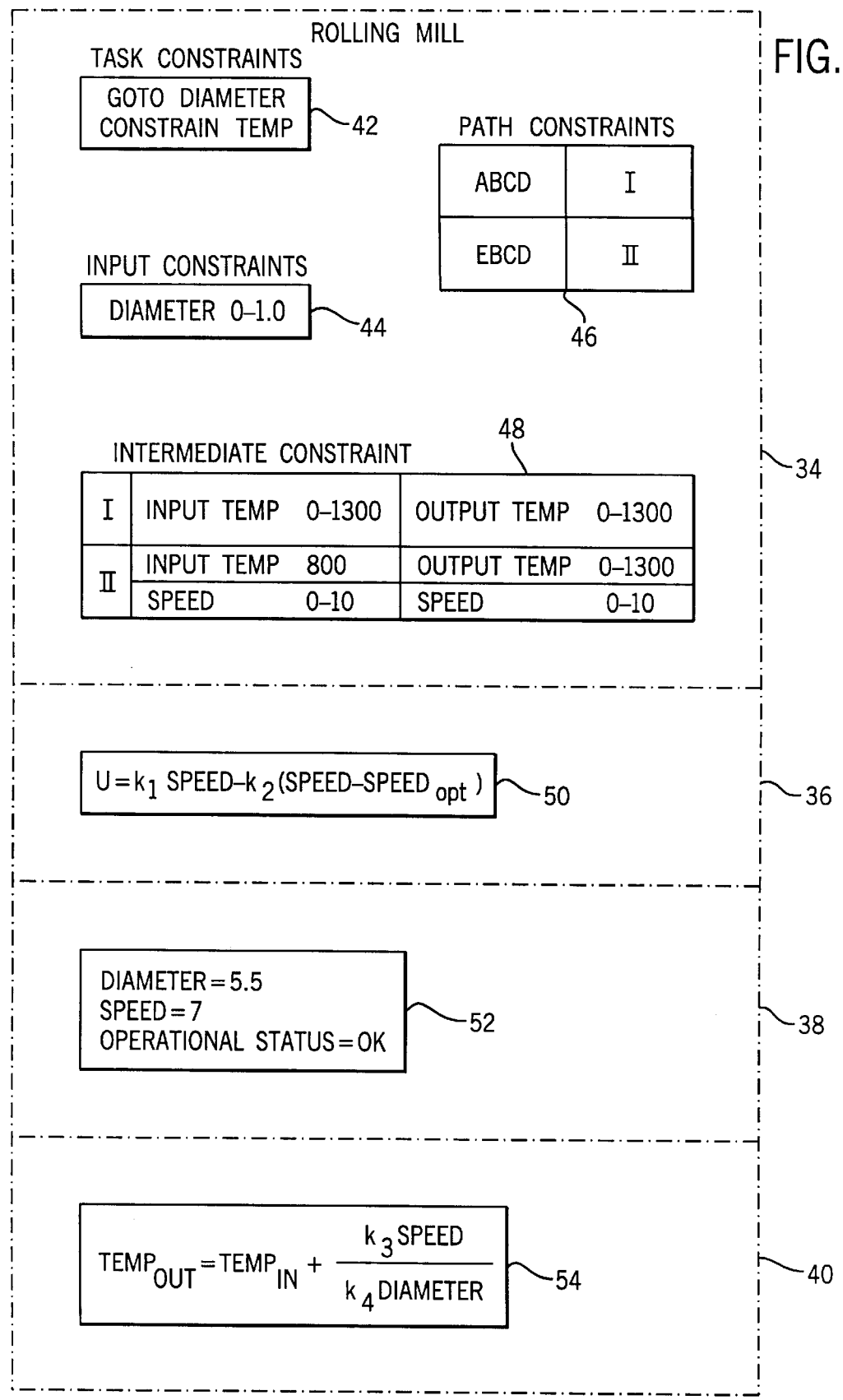
FIG. 4 is an expanded block diagram of the constraint data, goal data, self-assessment data, and model of FIG. 3.

Referring to FIG. 4, the constraints 34 are of a number of different kinds. Task constraints 42 describe generally the kind of operation that the associated machine 14 is intended to perform. Thus, for example, the reheat furnace 14a may perform heating tasks (GOTO TEMP); the rolling mill 14b (as shown) may perform a diameter reduction task (GOTO DIA.). The task constraints 42 allow the autonomous control units 16 to make a threshold determination as to whether their associated machines 14 will make a bid for a particular task of a plan to produce a product. Continuing with the example of the rolling mill 14b, the autonomous control unit 16a of the rolling mill 14b will only bid for tasks requiring diameter reductions.

The constraint data also includes input constraints 44 which describe the limits of the inputs to the associated machine 14. The inputs (as opposed to the outputs of the machines 14) are well defined and their ranges are set by the physical design of the machine. For example, for the rolling mill 14b, the input will be the amount of gas valve opening and the range of the input will be from zero to one hundred percent. For the rolling mill 14b, the inputs will be rolling diameter from 0 to 1. For the water bath 14c, the input will be water flow rate and for the Stelmor conveyor 14d, the inputs will be airflow rate. As used herein, input constraints are only those constraints independent of the operation of other machines 14.

Figure 5:
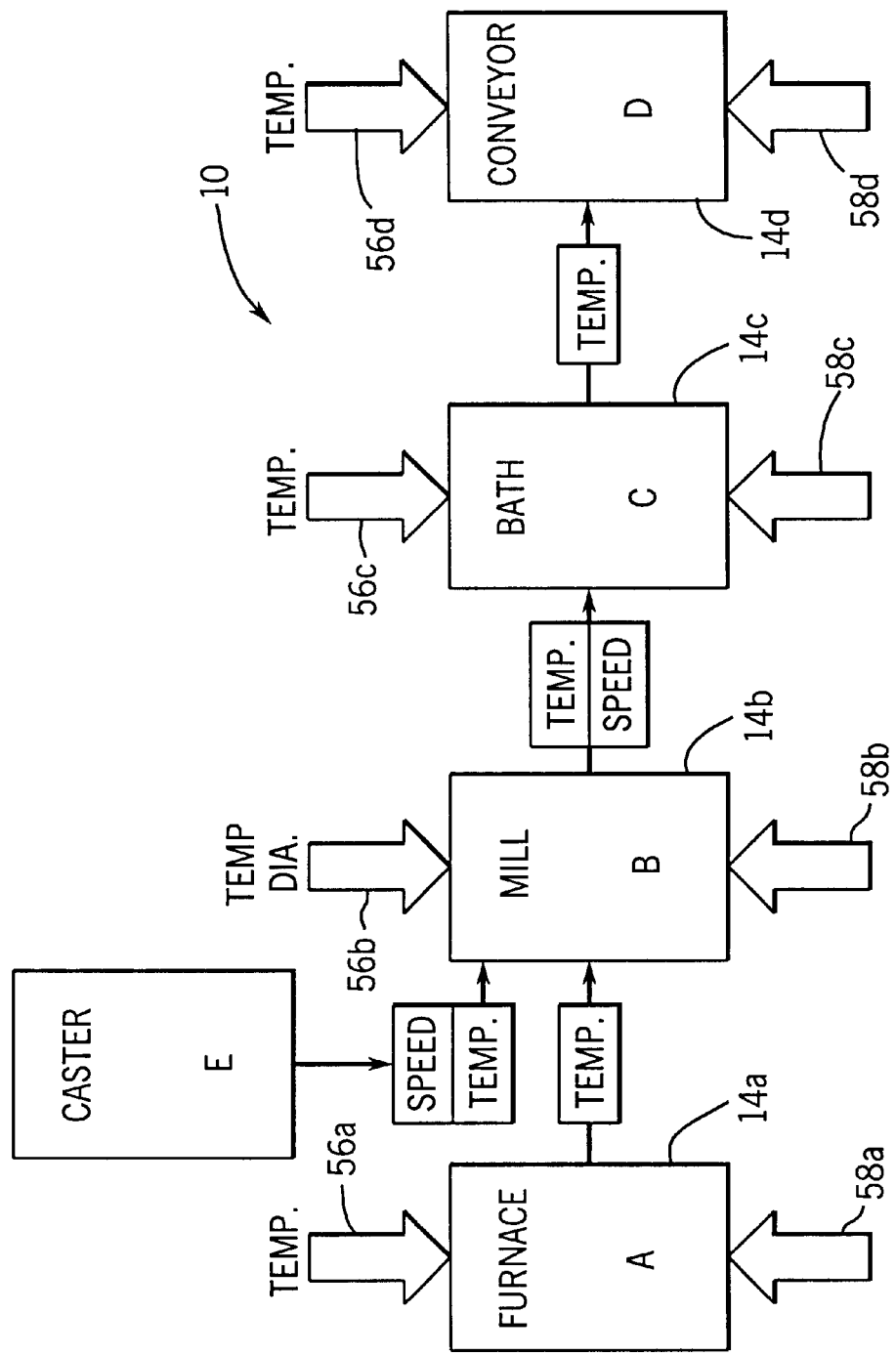
FIG. 5 is a graphical representation of the equipment of the rolling mill of FIG. 1 as defined by various inputs and constraints.

The constraints 34 also include path constraints 46 which generally reflect limitations on the possible paths of the product, e.g., the billet 12 between machines 14 as dictated by their physical layout. In this example, two paths are available, the first in which the billet 12 passes from reheat furnace 14a to rolling mill 14b, then to water bath 14c and finally to Stelmor conveyor 14d and the second where the billet 12 passes from continuous caster 14e to rolling mill 14b then to water bath 14c and finally to Stelmor conveyor 14d. These path topologies are reflected in the path constraints 46 listing the path in a first column and a set of intermediate constraints 48 (as will be described) in a second column. From this table, all possible paths between machines 14 may be determined. The task constraints 42, the path constraints 46 and the input constraints 44 will be termed generally "operational" constraints as they constrain the operation of the machine 14 in contrast to the inter-machine constraints to be described below. Referring also to FIG. 5, deriving from the path constraints 46 and possibly including other inputs of the machines 14 are the "inter-machine", or "intermediate" constraints 48 representing operating parameters shared between machines 14 based on the path of the material between machines 14. Generally these intermediate constraints 48 connect identical operating parameters of the machines 14 forming outputs of upstream machines in the material path with inputs of downstream machines in the material flow path. Thus the input temperature of the rolling mill 14b will be constrained to be equal to output temperature of the reheat furnace 14a or the output temperature of the continuous caster 14e depending on the particular path. The continuous caster 14e has an output speed and hence this is an inter-machine constraint for that path only. Generally, the rolling mill 14b and water box 14c also share output and input temperatures, respectively, and also billet speed i.e., the speed of exit of the billet 12 from the rolling mill 14b equaling the speed of entry of the billet into the water box 14c.

As a result of the coiling of the billet product in the Stelmor conveyor 14d the water box 14c and Stelmor conveyor 14d do not share the parameter of conveyor speed but do share the parameter of temperature as the temperature of the billet output from the water box 14b will equal the temperature of the billet 12 entering to the Stelmor conveyor.

Referring again to FIGS. 3 and 4, the memory may also hold goal data 36 implemented as a utility function 50 having as input arguments one or more of the characterizing parameters of the machine 14, either inputs or outputs, and as a value, an arbitrarily defined utility which reflects a preprogrammed goal of the autonomous control unit 16. In the case of the rolling mill 14b, the utility function 50 may be a function of speed reflecting a desire for high production, but also a particular speed for metallurgical reasons. A more complex utility function 50 might consider other metallurgical properties and wear on the equipment. Generally the autonomous control unit 16 strives to maximize utility within the operational and intermediate constraints.

Other machines will have other goals as selected and programmed by the user or manufacturer. The goals for the reheat furnace 14a, the water box 14c and Stelmor conveyor 14d are generally reduction of gas, water and air volume, respectively.

Referring still to FIGS. 3 and 4, the self-assessment data 38 will typically include various sensed parameters 52 of the associated machine 14. As shown in FIG. 4 for the rolling mill 14b, the self-assessment data includes current rolling diameter and the rolling speed (sensed outputs). A general operational status for the rolling mill 14b may also be provided as generated from other inputs and outputs and possibly a heuristic program evaluating the fitness of the machine 14. Generally the self-assessment data 38 is used to modify the operation constraints 34 if the operational status of the machine 14 is somehow impaired.

The model 40 provides a mathematical description 54 relating inputs to the machine 14 to its outputs and thus makes the performative generator specific to the subprocess of the machine 14. In the example of the rolling mill 14b, a simple linear equation of three variables is shown relating output temperature of the rolling mill 14b to the input temperature, the rolling speed and the diameter reduction. This model reflects generally the fact that the rolling process can increase the temperature of the stock. Generally far more complex models may be created relating one or more inputs to particular outputs of the machine. In most cases, the inverse of the model function is not also a function and thus an iterative process must be used to deduce an input from an output such as a binary search using successive input values until the desired output is arrived at.

For the reheat furnace 14a, the model 40 will take into account the time integral of the gas valve opening as reflects the heating of the furnace. The model for the water box 14c may relate cooling water flow and process speed to surface and internal temperatures. The model 40 for Stelmor conveyor 14d will provide a time and air flow relationship to temperature of the output billet 12. The construction of such models is generally understood in the art and will depend on the particular machine 14.

Job Description Language

Referring now to FIGS. 1 and 5, a "product" autonomous control unit 16 may be implemented by an arbitrary controller 20 to represent the desired product to be manufactured from the billet 12. This product autonomous control unit provides a convenient unit for implementing the functions of describing the product to the autonomous control units 16 of the machines 14 and of evaluating the plans produced by the autonomous control units 16 against the product definition. For this first task, the product autonomous control unit, accepts input from a user through computer terminal 22 describing the product characteristics and produces a machine independent description of desired tasks for producing that product in a job description language. In the preferred embodiment, the job description language is an ASCII text file providing a number of steps defining desired machine outputs. For example, to produce a rolled billet, the job description is as follows:

STEP 1=
  GOTO TEMP(ALL)<1300.0
STEP 2=
  GOTO DIAMETER=5.5 TOL(−0.2, 0.2)
  CONSTRAIN TEMP(ALL)<1300.0
  CONSTRAIN TEMP(ALL)>825.0 AT TIME=END
  DEPENDS ON (1)
STEP 3=
  GOTO TEMP(SURF)=850 TOL(−5.0, 5.0)
  CONSTRAIN TEMP(ALL)>825.0 AT TIME=0.0
  CONSTRAIN TEMP(SURF)>450.0 AND<1300.0
  WITH DIAMETER=5.5
  DEPENDS ON (2)
STEP 4=
  GOTO TEMP(AVG)=650.0 TOL(−5.0, 5.0) IN TIME<15.0
  CONSTRAIN TEMP(SURF)>500 AT TIME>=0.0 AND <=2.0
  WITH DIAMETER=5.5
  DEPENDS ON (3)
STEP 5=
  GOTO TEMP(AVG)=600.0 TOL(−5.0,5.0) IN TIME >40.0
  WITH DIAMETER =5.5
  DEPENDS ON (4)

Each step defines temperatures (TEMP), diameters (DIAMETER) and tolerances (TOL) of the billet and the sequence (DEPENDS ON) and timing (AT TIME) of the steps. In this example, both surface temperature (SURF) and overall temperature (ALL) is considered and so the models 40 must provide outputs for both.

Operation of the Control System

Figure 6:
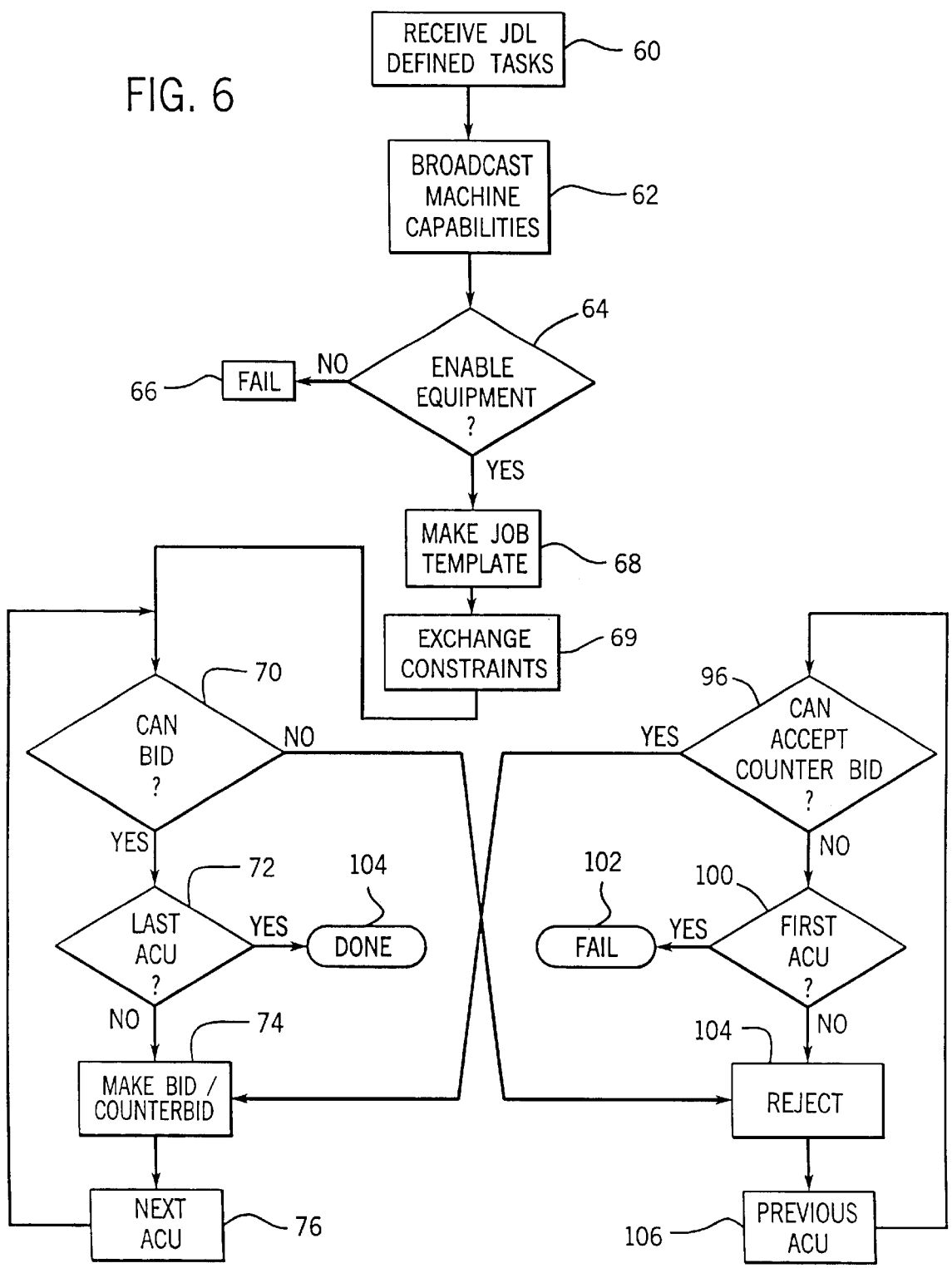
FIG. 6 is a flow chart of the bid program of FIG. 3 such as may be used to generate a control strategy communicated through bids expressed by performatives and data for the machines of FIGS. 1 and 5.

The operation of the autonomous control units 16 (and the controller 20) will now be described with reference to the flow chart of FIG. 6. The flow chart of FIG. 6 is executed in part by different autonomous control unit 16a and the controller 20 as will be apparent from context.

At a first step, the job description language (JDL) is generated by the autonomous control unit implemented in controller 20 for the product and is represented by process block 60. At succeeding process block 62, the JDL is broadcast over the communication link 18 accompanied by a performative identifying it as such.

As indicated by decision block 64, each autonomous control unit receiving the broadcast JDL evaluates the tasks of the JDL generally in light of its own task constraints 42 and submits to the most upstream autonomous control unit 16 in the path (indicated by the path constraints 46), and in this case the reheat furnace 14a, an indication of which tasks represented by steps in the JDL, it can perform. The data is again associated with a performative indicating that is associated with this preliminary stage of the bidding process.

The most upstream autonomous control unit 16a, based on the received indications about task capability from the other autonomous control units 16, next tries to create one or more "template job plans" representing a possible allocation of tasks to machines 14. In the event that there is not at least one autonomous control unit 16 indicating an ability to perform at least each step of the JDL, the most upstream autonomous control units 16a proceeds to a fail state 66 indicating that the desired product cannot be produced by the machines 14.

More typically, at process block 68, one or more job templates will be created as described. A number of different job templates may address different allocation of machines 14 to different steps of the JDL or different material flow paths in the case where the topology is not as simple as the example used herein, or different job templates may address different products.

The job plans are then broadcast, wit the appropriate performatives, to the autonomous control units 16 which extract the path constraints 46 from the material paths contained in the job plans and establish a set of machine relationships manifest in the inter-machine or intermediate constraints 48. A different set of machine relationships will be prepared for each job plan reflecting possibly different material paths and hence different machine interactions. Each autonomous control unit 16 initially is programmed with a set of ranges for the intermediate constraints 48, the ranges based on the known characteristics of the machine associated with the autonomous control unit 16, for example, a speed or temperature range which may be determined by the design of the machine 14. As indicated by process block 69, these initial ranges are then exchanged with the upstream and downstream machines sharing the same operational parameters as indicated by the intermediate constraints 48. For example, for a first path where rolling mill 14b receives billets 12 from the reheat furnace 14(a), the oven output temperature range may be 0 to 2000 degrees substantially larger than the rolling mill 14b input temperature range of 1000 to 1200 degrees. In this case, the intersection of these two ranges 1000–1200 is adopted by the reheat oven 14a and the rolling mill 14b for this shared parameter. In contrast, for a second path where the rolling mill 14b receives billets 12 from the continuous caster 14(e), the casting process may require a narrow temperature range about 800 degrees so as to preserve pliability of the billets 12 and to prevent eruption of the cooling liquid interior. In this case, the intersection of the ranges for the continuous caster 14e and the rolling mill 14b is the single value 800. Note that if the rolling mill 14b had a smaller range in input temperature than the output of the continuous caster 14e, the smaller range of the rolling mill 14b would be adopted by the continuous caster 14e.

The purpose of this exchange of ranges is to simplify the bidding process which is described below by enabling the autonomous control units to eliminate bids, and hence avoid the bidding process for values outside the combined solutions space of these ranges.

After this exchange, the most upstream machine 14, either the reheat furnace 14a or the continuous caster 14e, then reads the first step of the JDL, which in this case indicates that the temperature of the product should be raised to a value of less than 1300 degrees, and evaluates whether it can create a bid for that task as indicated by process block 70. Specifically, the autonomous control unit 16 evaluates its current temperature in its self-assessment 38 and its goals 36 and the requirements of the JDL to create a bid indicating a specific temperature to which the reheat furnace will raise the billet 12. In this case, the intermediate constraints 48 are those associated with the reheat furnace 14a and material path I. Simultaneously, a similar process is performed by the continuous caster 14e for material path II.

Assuming that the autonomous control unit 16a of the reheat furnace 14a (and/or the continuous caster 14e) may make a bid within the above constraints, the program proceeds to decision block 72 to test if this is the last autonomous control unit on the job path (i.e., in either case, the Stelmor conveyor 14d). At this time it is not, and so the program proceeds to process block 74 where the bids are perfected by transmitting them, identified by the appropriate performative and containing bid data value, to the succeeding rolling mill 14b and more generally to the autonomous control unit(s) immediately downstream from the autonomous control unit 16 making the bid. The autonomous control unit 16a also updates an internal bid storage table (not shown) and a counter-bid, to be described, may be also made at this time.

The process then proceeds to the next autonomous control unit 16b as generally shown by process block 76. The next autonomous control unit 16b, associated with the rolling mill 14b, receives the template plans and the bids proposed by the reheat furnace 14a and the continuous caster 14e. At process block 70, autonomous control unit 16b determines whether it can make a bid based on the information from the JDL and on the constraints 34, including this time, constraints from the table holding intermediate constraints 48 which links the input temperature or the rolling mill 14b to the output temperature of the reheat furnace 14b or continuous caster 14e depending on the bid. The modification of the intermediate constraints 48 to reflect the restraints of adjacent machines makes this generation of the bids more robust against constraints of the other machines and thus less likely to trigger time consuming counter-bids. Nevertheless, because the counter-bid process strives to preserve the range of the intermediate constraints 48, the autonomous control unit making the bid can exercise some influence on the job plan from its unique goals.

In the example given, the JDL requires that the temperature of the billet 12 be greater than 825 degrees at the end of the rolling. Assuming for the moment that the temperature selected by the reheat furnace 14a is insufficient for the rolling mill 14b to reach the required output temperature (as may be determined by model 40 for the rolling mill 14b), then at process block 70, the autonomous control unit 16b proceeds to process block 104 to generate rejection response.

For the counter-bid, the autonomous control unit 16b must first determine an acceptable input temperature to the rolling mill 14b. Generally this cannot be done by consulting stored input constraints for temperature because the relevant constraints will dynamically depend on the particular output temperature required. Accordingly, the program 32 of the autonomous control unit 16b must refer to the model 40.

Figure 7:
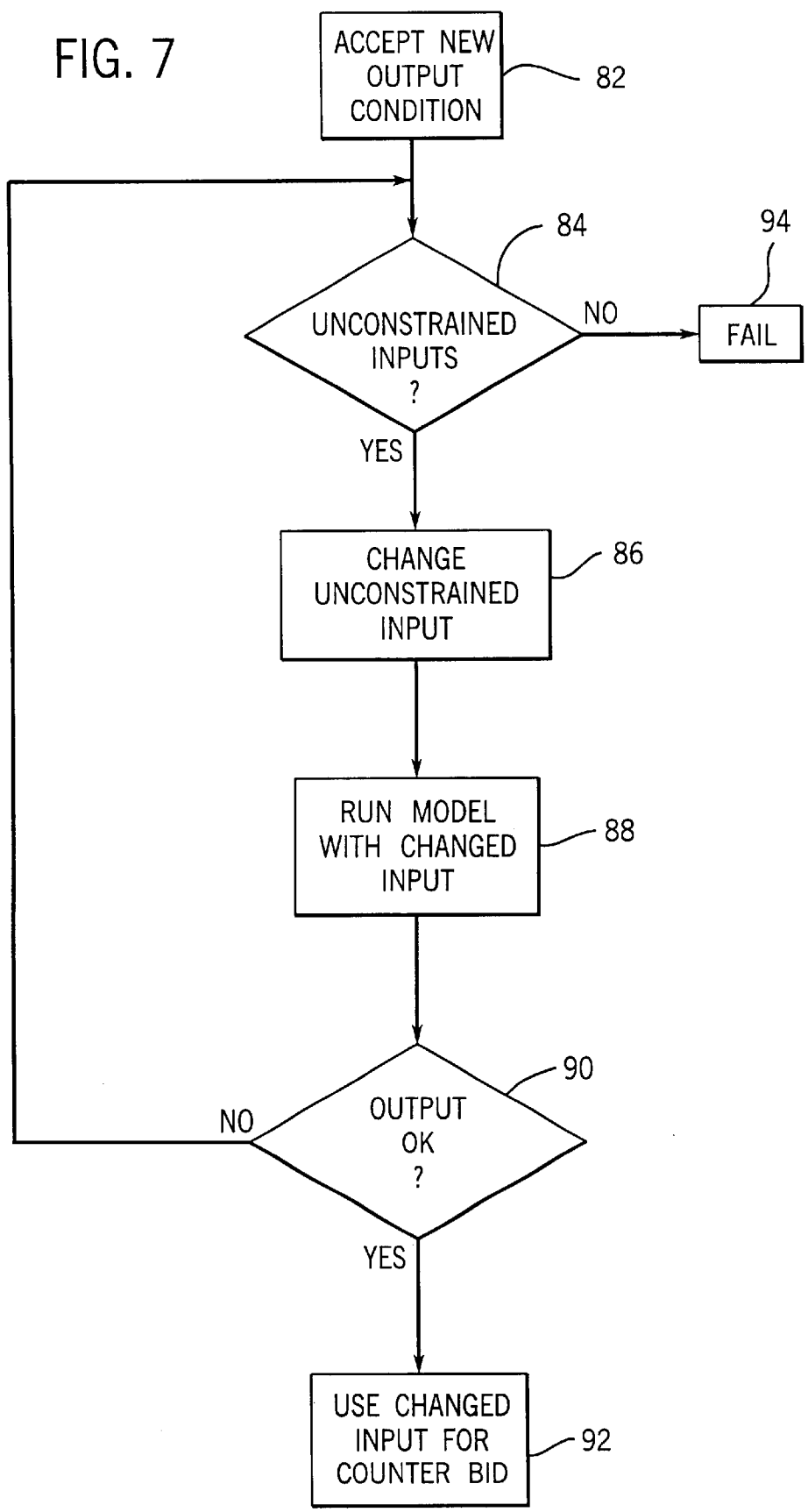
FIG. 7 is a flow chart of the operation of the model of FIG. 3 and 4 in responding to a counter-bid performative per the flow chart of FIG. 6.

Referring now to FIG. 7, the process of determining the necessary input temperature (or an arbitrary input value from a defined output) begins at a process block 82 in which the new defined output condition is established. In this example the output condition is a temperature of greater than 825 degrees as required by the JDL.

At decision block 84, an unconstrained input is identified, in this case an input temperature from the reheat furnace 14a within a temperature range permitted by the rolling mill 14b. By unconstrained it is meant that the input may be varied in a desired direction without violating the input constraints 44.

At process block 86, the identified input is modified in a direction to reduce the difference between the desired output value (per the JDL and process block 82) and the modeled output value produced by evaluating the model 40 with the unmodified input. The modified input is then evaluated by executing the model 40 as indicated at process block 88 to produce a new output.

At decision block 90, the current output from the model 40 is matched to the desired new output from process block 82 and if the outputs match within a tolerance the modified input established at process block 86 is used for the counter-bid as indicated by process block 92. The counter-bid incorporates a new range for the input rather than a single input value so as to preserve the flexibility of the autonomous control units accepting the counter-bid as much as possible. If the modification of the input was downward, then the input becomes the new upper boundary of the input range, whereas if the modification of the input was upward, the input becomes the new lower boundary of the range. The new range is forwarded to autonomous control units for the corresponding upstream machine as part of the counter-bid.

More typically, at least initially, the outputs will not match and the program loops back to process block 84 for a second or subsequent iteration. If prior to a matching of the outputs, the input becomes constrained and there are no further inputs that can be modified, the program proceeds to a fail block 94 indicating the process cannot be completed.

Referring again to FIG. 6, assuming that a suitable counter-bid can be obtained at process block 92 of FIG. 7, the counter-bid is perfected by forwarding it to the proceeding autonomous control unit 16, in this case, autonomous control unit 16a for the reheat furnace 14a.

Autonomous control unit 16a receiving the counter-bid at decision 96 then determines whether it can accept the counter-bid's new proposed output temperature range. The model 40 for the reheat furnace 14a (not shown) may be invoked to determine whether with practical inputs (per input constraints 44), the desired output temperature value can be obtained. Often a range of possible modified bids are available and one bid is selected by use of the goal of the utility function 50. The counter-bid may be accepted if the autonomous control unit 16a can create a bid using input values that do not violate the intermediate constraints.

Referring again to decision block 96, if the counter-bid cannot be accepted then at decision block 100, a test is performed to see if the autonomous control units 16 receiving the counter-bid is the first autonomous control unit 16. If it is, then the program proceeds to process block 102 and a failure condition is indicated as would be the case were the reheat furnace 14a receiving the counter-bid.

More typically, however, the autonomous control unit 16 receiving a counter-bid will not be the first autonomous control unit 16 and thus it is possible to reject the bid and allow possibly other counter-bids as indicated by process block 104.

Bids and counter-bids may thus ripple up and down the chain of autonomous control units 16a, 16b, 16c, and 16d and the chain of autonomous control units 16e, 16b, 16c, and 16d until at process block 72, the last autonomous control unit in the material path is successfully bid for each chain and the program proceeds to process block 104 and the completed plans are forwarded to the product autonomous control unit in the controller 20 to be evaluated.

The product autonomous control unit in controller 20 may then accept one of the plans or may change the job description in a process analogous to the counter-bidding proposal and the process may be repeated. As a result of the possibility of unresolvable bidding outcomes, the product autonomous control unit 16 normally produces a time limit on the process which if exceeded causes the process to indicate a failure.

Figure 8:
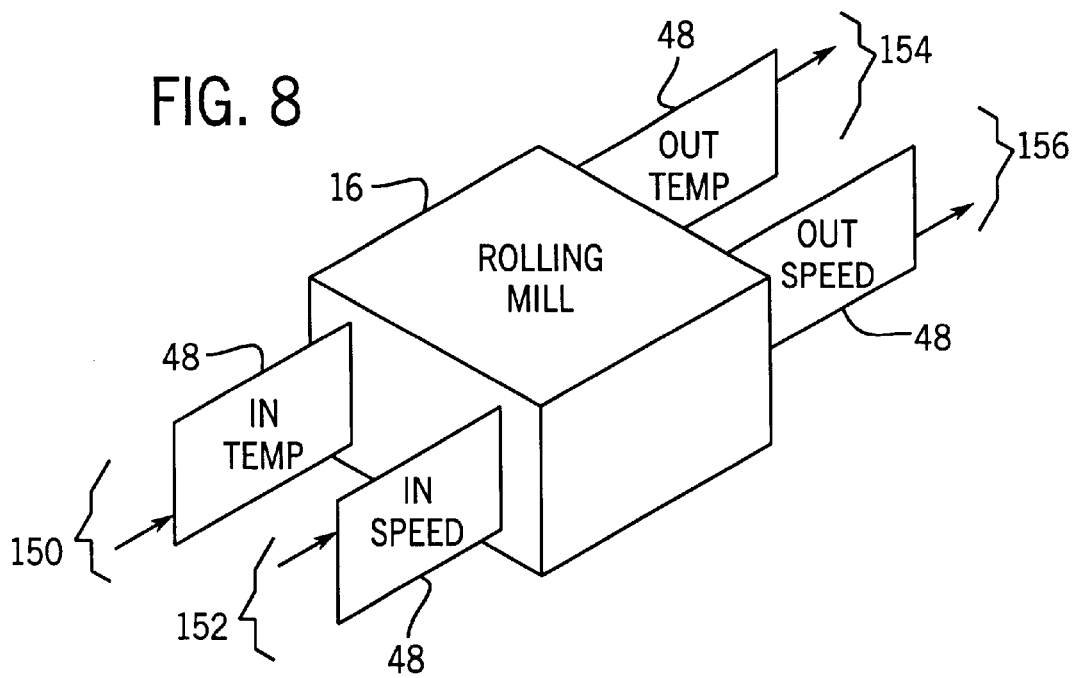
FIG. 8 is a perspective representation of a sub-process (e.g., equipment) controlled by an autonomous control unit showing input and output variables falling within input and output constraint ranges.

Referring now to FIGS. 4 and 8, during the bidding process, the autonomous control unit 16, for example, for the rolling mill 14b receives variables of input temperature 150 and input speed 152 through bids which fall within the intermediate constraints 48 for those particular variables. The autonomous control unit 16 may in turn transmit variables of output temperature 154 and output speed 156 as bids to other autonomous control units 16, such outputs being also within intermediate constraints 48.

Because of the complexity of a typical sub-process such as that of the rolling mill 14b, in general, the variables of output temperature 154 and output speed 156 will be complex functions of both input temperature 150 and input speed 152. The fact that a bid input temperature 150 and input speed 152 both falls within their constraint ranges thus does not guarantee that the variables of output temperature 154 and output speed 156, resulting from those input variables and possible other inputs to the sub-process, will fall within their intermediate constraints 48. For this reason prior to evaluating any bid containing input variables, requires taking the input variables of the bid, running them in the model of the sub-process, in this case the rolling mill model 40 to determine whether the corresponding outputs are consistent with the output intermediate constraints 48.

Figure 9:
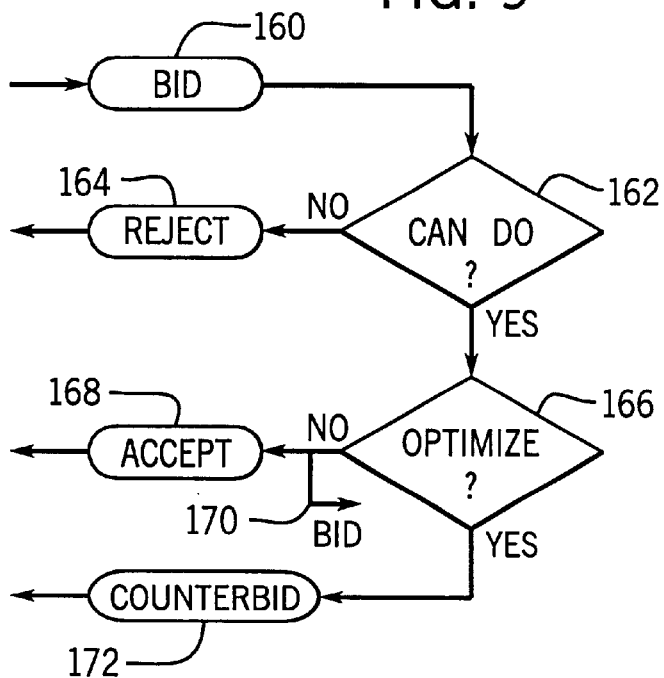
FIG. 9 is a flow chart showing a response by an autonomous control unit to a preliminary bid performative.

Referring to FIG. 9, in this regard, a preliminary bid 160 may be received by the autonomous control unit 16 and a determination made, as indicated by decision block 162, as to whether that bid can be accepted. As described above, the intermediate constraints 48 have been shared between the autonomous control units 16 so it can be assumed that any input values in a bid 160, for example, temperature and speed for rolling mill 14a, are within their intermediate constraints 48. Nevertheless, it must be determined whether the rolling mill 14a operating according to the proposed values of the bid 160 will produce acceptable output values meeting the job description and the physical limitations of the rolling mill sub-process 14b and possibly downstream limitations of succeeding machines as embodied in the range of the intermediate constraints 48.

Figure 13:
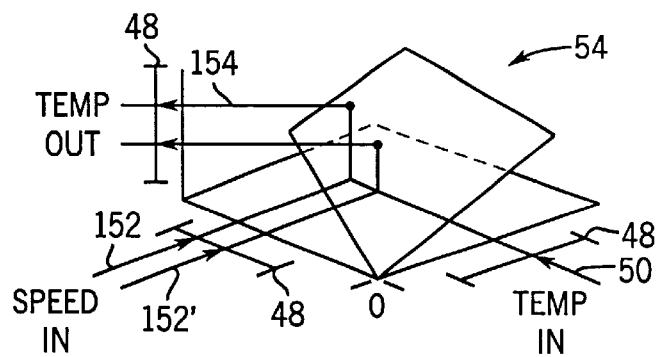
FIG. 13 is a graphical representation of a simple model for an autonomous control unit showing application of the model to a propose bid value to determine acceptance or rejection performatives.

Referring now to FIG. 13, the model 40 of the sub-process 14b of the rolling mill converts the input values contained in the bid, for example, input speed 152 and input temperature 150, into a value of output temperature 154. A three-dimensional model is shown accommodating the three variables of input temperature, output temperature and speed, however, it will be understood that generally the models will have multiple dimensions corresponding to all possible sub-process variables of interest.

If the modeled variable of output temperature 154 falls outside of the corresponding range of intermediate constraints 48 applicable to that output variable, then as shown in FIG. 9, a rejection of the bid is transmitted to the bidding autonomous control unit as shown by process block 164.

On the other hand, if the modeled output temperature 154 falls inside the range of its corresponding intermediate constraints 48 as shown in FIG. 13, then the autonomous control unit 16 proceeds to optimize process block 166 where it is determined whether there exist better values of input speed 152 or input temperature 150 according to the internal utility function 50 of the autonomous control unit. Generally, a preferred input speed 152= may be deduced using the utility function 50. The particular variable optimized is determined by a preference provided in the table of intermediate constraints 48.

The preferred input speed 152= must also be constrained so that the variable of output temperature falls within the corresponding range of its intermediate constraints 48 of the outputs. For this reason, a binary search routine may be used to vary the input speed 152 so that it is moved successively in repeated iteration of half the remaining distance to the optimal input speed 152=. At each iteration, the changed variable of input speed 152 is modeled to ensure that the output temperature 154 remain within its range.

Figure 15:
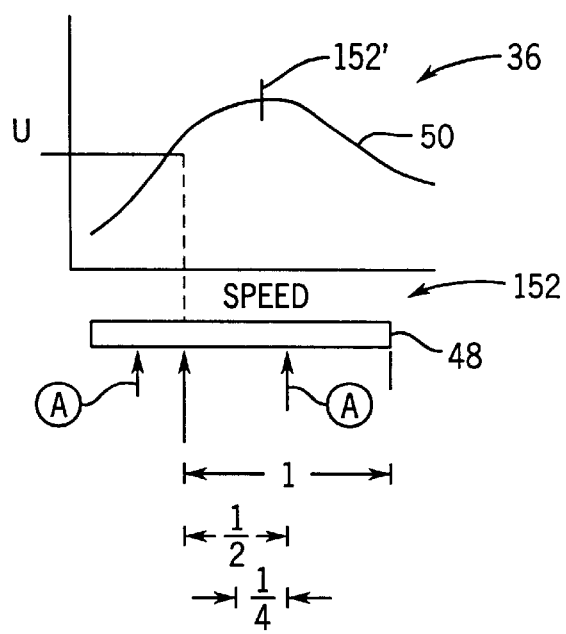
FIG. 15 is a graphical representation of an iterative process used to optimize input values in a manner analogous to the process of FIGS. 13 and 14.

Referring now to FIG. 15, in an alternative embodiment, if the utility function 50 is not well characterized for analytic maximization, the input speed 152 may be alternately moved half the distance to the terminus points 151 of its range of intermediate constraint 48 to values indicated by arrows A. That value, which when modeled, both yields an output temperature 154 remaining within its intermediate constraints 48 and the highest utility is then adopted and half that distance of movement is made to the adopted value of variable 152 in two directions and the same logic applied, until changes in utility below a certain tolerance value are obtained at which case the then current value is adopted as the preferred input speed 152'.

Referring again to FIG. 9, in the event that no optimized value can be obtained, then at process block 168, an acceptance bid is sent to the bidding autonomous control unit and as indicated by arrow 170, a bid is passed downstream using the new output values deduced from the model 40. On the other hand, if an optimized value can be obtained, then as indicated by process block 172, a counter-bid incorporating the new input value 152 is sent to the bidding autonomous control unit. The counter-bid 172 includes an acceptance of the original bid as well.

Figure 10:
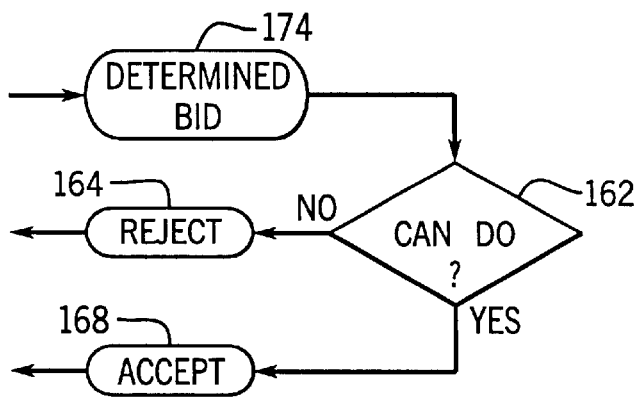
FIG. 10 is a flow chart showing a response by the autonomous control unit to a determinative bid performative.

Referring now to FIG. 10, an additional performative of bid beyond the proposed bid 160 described above may be implemented by further distinguishing the bids with their wrapper surrounding the bid message according to additional performatives. This additional performative of bid is a determination bid which indicates that no optimizing is allowed. Accordingly, when such a determination bid is received as indicated by process block 174, at process block 162, a rejection at process block 164 is provided or an acceptance at process block 168 only according to the rules described above with respect to process block 162.

Figure 11:
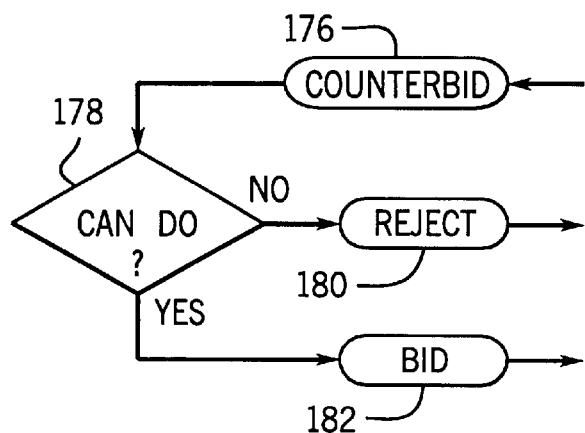
FIG. 11 is a flow chart showing a response by the autonomous control unit to a counter-bid performative.
Figure 12:
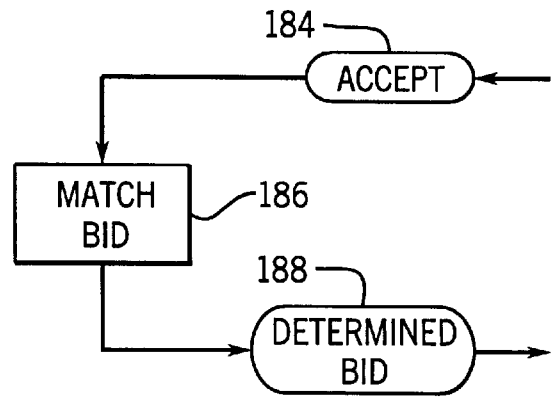
FIG. 12 is a flow chart showing the response by the autonomous control unit to an acceptance of a bid performative.

Referring now to FIG. 11, the autonomous control unit may receive a counter-bid 176, such as is generated by process block 172 of FIG. 9 from a succeeding autonomous control unit. At process block 178, the autonomous control unit must determine whether it can accept this counter-bid 176 which unlike a bid 160 proposes values of output variables to the autonomous control unit 16 as opposed to values of input variables.

Figure 14:
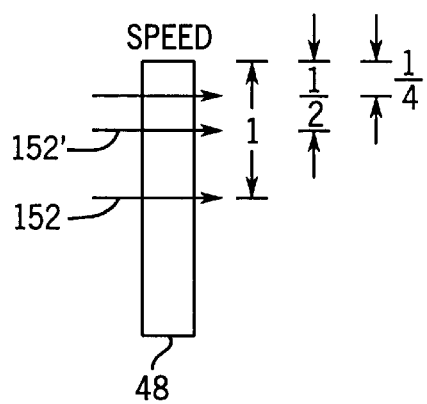
FIG. 14 is a graphical representation of the iterative process used with the model of FIG. 13 to traverse input space when counter-bid performatives proposing output values are received.

Referring now to FIG. 14, the model 40 is again employed for counter-bid 176 to determine whether the counter-bid 176 may be accepted. In this case, the model 36 is used to determine whether inputs 150 and 157 corresponding to the counter-bid output will fall within their constraint ranges 48. Again a binary search algorithm may be adopted to scan through the input space of the model 36 until the appropriate output is obtained. In this way the model may in effect be run backwards. The input variable to be changed is determined by a preference contained in the table of intermediate constraints 48.

In the case where a value of input speed 152 was associated with the bid 160 that produced the counter-bid 176, a new value of output temperature 154=halfway between the bid 152 and a terminus point 151 of the constraint range for that variable is adopted. That input is modeled to see how close the output is to the value of the counter-bid 176 and if the output has moved closer to the desired output, the process is repeated again moving the variable 152 by half its previous moved distance. Movement in the opposite direction is undertaken if the output value is not converging. This process is repeated until convergence upon the desired output value of the counter-bid 176 is reached (within a predefined tolerance) or else convergence is clearly indicated as impossible. In the latter case, a rejection of the counter-bid is sent as indicated by process block 180. However, in the former case, a bid is forwarded as indicated by process block 182 incorporating the counter-bid values.

An alternative situation may occur when a counter-bid is accepted as indicated by process block 184. In this case, it is matched with a previously made bid 186 and a determinative bid 188 is made to be received as indicated by the discussion of FIG. 10.

The above description has been that of a preferred embodiment of the present invention, it will occur to those that practice the art that many modifications may be made without departing from the spirit and scope of the invention. In order to apprise the public of the various embodiments that may fall within the scope of the invention, the following claims are made.

We claim:

1. An autonomous control unit forming part of an industrial controller for controlling a process, the autonomous control unit associated with a sub-process of the process and used with other autonomous control units associated with other sub-processes, each subprocess having input variables describing input conditions to the subprocess and output variables describing output conditions of the subprocess, the autonomous control unit comprising;

(a) a network connection allowing intercommunication between the autonomous control unit and other autonomous control units and a receipt by the autonomous control unit of a job plan describing the process;

(b) an electronic memory holding
      (1) a subprocess model relating the input variables to the output variables for the sub-process;
      (2) a constraint table holding a constraining range for the input and output variables having range extremes;

(c) an electronic computer communicating with the network connection and the electronic memory and executing a stored program to:
      (1) receive a proposed value of an output variable from a second autonomous control unit;
      (2) try selected input variables in the subprocess model to produce a resultant output variable;
      (3) iteratively change the selected input variables until the resultant output variable matches the proposed value of the output variable;
      (4) compare an ultimate value of the iteratively changed selected input variable to the constraining range; and
      (5) when the ultimate value satisfies the constraint range, responding to the second autonomous control unit indicating acceptance of the proposed input variable as part of a response to the job plan.

2. The autonomous control unit of claim 1 wherein the iteratively changed selected input variables change at each iteration by one half the difference of a previous iterative change.

3. The autonomous control unit of claim 1 wherein the proposed value of an output variable from a second autonomous control unit is in response to a previous bid input value from the autonomous control unit to the second autonomous control unit, and wherein the iteratively changed selected input variable is initially changed by one half of the difference between the input value and one range extreme and thereafter changes each iteration by one half the difference between a previous iterative change.

4. The autonomous control unit of claim 1 wherein the constraints range is derived from at least one of the: job plan, physical limits of the sub-process of the first autonomous control unit, or physical limits of a sub-process associated with a third autonomous control unit communicating with the sub-process of the first autonomous control unit.

5. The autonomous control unit of claim 1 wherein the output variable is a function of multiple input variables and wherein the selected input variable is chosen from among multiple input variables according to a predetermined priority list.

6. An autonomous control unit forming part of an industrial controller for controlling a process, the autonomous control unit associated with a sub-process of the process and used with other autonomous control units associated with other sub-processes, each subprocess having input variables describing input conditions to the subprocess and output variables describing output conditions of the subprocess, the autonomous control unit comprising;
   (a) a network connection allowing intercommunication between the autonomous control unit and other autonomous control units and a receipt by the autonomous control unit of a job plan describing the process;
   (b) an electronic memory holding
      (1) a subprocess model relating the input variables to the output variables for the sub-process;
      (2) an optimizing function indicating preferred values of the input variables;
      (3) a constraint table holding a constraining range for the input and output variables having range extremes;
   (c) an electronic computer communicating with the network connection and the electronic memory and executing a stored program to:
      (1) receive a proposed value of an input variable from a second autonomous control unit;
      (2) apply the proposed value of the input variable to the model to produce a resultant output variable;
      (3) when the resultant output variable is within its constraint range, iteratively change the value of the input variables applied to the model to optimize the input variable according to the optimizing function while keeping the output values within the constraint range; and
      (4) responding to the second autonomous control unit indicating a counterbid of the iteratively changed value of the input variable.

7. The autonomous control unit of claim 6 wherein the iteratively changed input variable changes at each iteration by one half the difference of a previous iterative change.

8. The autonomous control unit of claim 6 wherein the iteratively changed selected input variable is initially changed by one half of the difference between the proposed value of an input variable and an optimized value determined by the optimizing function and thereafter changes each iteration by one half the difference between a previous iterative change.

9. The autonomous control unit of claim 6 wherein the constraint range is derived from at least one of the job plan, limits of the sub-process of the first autonomous control unit, or the limits of a sub-process associated with a third autonomous control unit communicating with the sub-process of the first autonomous control unit.

10. The autonomous control unit of claim 6 wherein multiple proposed input variables are received from the second autonomous control unit and wherein the output variable is a function of multiple proposed input variables and wherein the optimized input variable is chosen from among the multiple proposed input variables according to a predetermined priority list.

* * * * *